United States Patent
Kim

(10) Patent No.: US 9,146,713 B2
(45) Date of Patent: Sep. 29, 2015

(54) TOOL COMPOSITION FOR SUPPORTING OPENCL APPLICATION SOFTWARE DEVELOPMENT FOR EMBEDDED SYSTEM AND METHOD THEREOF

(71) Applicant: Electronics and Telecommunications Research Institute, Daejeon (KR)

(72) Inventor: Jeong Si Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 13/966,133

(22) Filed: Aug. 13, 2013

(65) Prior Publication Data

US 2014/0123101 A1    May 1, 2014

(30) Foreign Application Priority Data

Oct. 30, 2012    (KR) .................. 10-2012-0121067

(51) Int. Cl.
*G06F 9/45*   (2006.01)
*G06F 9/44*   (2006.01)

(52) U.S. Cl.
CPC .. *G06F 8/41* (2013.01); *G06F 8/71* (2013.01); *G06F 8/40* (2013.01)

(58) Field of Classification Search
CPC ........................................................ G06F 8/71
See application file for complete search history.

(56) References Cited

U.S. PATENT DOCUMENTS

| | | | |
|---|---|---|---|
| 7,543,285 B2 * | 6/2009 | Cabillic et al. | 717/158 |
| 2002/0112227 A1 * | 8/2002 | Kramskoy et al. | 717/148 |
| 2005/0193372 A1 * | 9/2005 | Wu et al. | 717/118 |
| 2008/0016507 A1 * | 1/2008 | Thomas et al. | 718/100 |
| 2008/0276262 A1 * | 11/2008 | Munshi et al. | 719/328 |
| 2009/0307699 A1 * | 12/2009 | Munshi et al. | 718/102 |
| 2010/0218196 A1 * | 8/2010 | Leung et al. | 718/107 |
| 2010/0257507 A1 * | 10/2010 | Warren | 717/106 |
| 2011/0161495 A1 | 6/2011 | Ratering et al. | |
| 2011/0161944 A1 * | 6/2011 | Cho et al. | 717/149 |
| 2012/0284502 A1 * | 11/2012 | Zievers | 713/100 |
| 2013/0141443 A1 * | 6/2013 | Schmit et al. | 345/505 |
| 2013/0191722 A1 * | 7/2013 | Gibbs et al. | 715/234 |
| 2014/0149969 A1 * | 5/2014 | Brower et al. | 717/140 |

FOREIGN PATENT DOCUMENTS

| | | |
|---|---|---|
| KR | 10-0550477 | 2/2006 |
| KR | 10-2011-0060418 | 6/2011 |
| WO | 2009/148714 | 12/2009 |

* cited by examiner

*Primary Examiner* — Chameli Das
(74) *Attorney, Agent, or Firm* — Kile Park Reed & Houtteman PLLC

(57) ABSTRACT

Provided are a tool for supporting open computing language (OpenCL) application software development for an embedded system and a supporting method thereof. The tool in conjunction with a target system includes a project management unit configured to separate and store OpenCL application software constituted of a host program and a kernel program into a host source code corresponding to the host program and a kernel source code corresponding to the kernel program, and manage a tool-chain corresponding to an OpenCL platform of the target system, and a builder configured to determine a compile type of the kernel source code and determine whether the kernel source code is built in response to the compile type. Accordingly, it is possible to rapidly provide a tool for supporting OpenCL application software development that can develop OpenCL application software for an embedded system.

16 Claims, 3 Drawing Sheets

TOOL COMPOSITION FOR SUPPORTING OPENCL APPLICATION SOFTWARE DEVELOPMENT FOR EMBEDDED SYSTEM AND METHOD THEREOF

CLAIM FOR PRIORITY

This application claims priority to Korean Patent Application No. 10-2012-0121067 filed on Oct. 30, 2012 in the Korean Intellectual Property Office (KIPO), the entire contents of which are hereby incorporated by reference.

BACKGROUND

1. Technical Field

Example embodiments of the present invention relate in general to a tool for effectively supporting open computing language (OpenCL) application software development and more specifically to a tool composition for supporting OpenCL application software development for an embedded system and a supporting method thereof.

2. Related Art

In recent years, with popularization of multi-core or many-core processors for improving computing performance, there has been a growing interest in software technology development for utilizing the computer system.

Open computing language (OpenCL) is one of computing standard frameworks for providing parallel computing based on multi-core or many-core processors. Here, OpenCL may be constituted of an OpenCL language, an application programming interface (API), a library, and a runtime system.

The OpenCL language that is a new parallel programming language provided by OpenCL standard makes it easy to create high-performance computing software having high efficiency and portability. That is, the OpenCL language is a latest programming language that supports heterogeneous multi-core-based parallel computing.

Meanwhile, OpenCL application software may include a host program written in C and C++ and a kernel program written in C99-based OpenCL language.

The host program performs the OpenCL application software, and performs control and data transmission between the host program and the kernel program using an OpenCL API. The kernel program is a program that performs actual computation.

Here, a typical tool for supporting OpenCL application software development requires an OpenCL software development kit (SDK) that includes OpenCL library and toolkit for developing the OpenCL application software. Specifically, core manufacturers may provide their own OpenCL SDKs developed for supporting their specific cores to developers, the developers may select and install an OpenCL SDK suitable for their development systems, and therefore an OpenCL application software development environment may be prepared.

An existing tool for supporting the OpenCL application software development is not just for a dedicated tool for the OpenCL application software development.

Accordingly, the developer has to manually and directly change and set an OpenCL development environment so that a general OpenCL development environment can allow OpenCL application software development.

In addition, the existing tool for supporting the OpenCL application software development supports only a local desktop environment, and therefore embedded system developers requiring a remote embedded development environment cannot use a general tool for supporting OpenCL application software development.

Meanwhile, with respect to a build method of a kernel source code of the kernel program of the OpenCL application software, an OpenCL development environment for an embedded system and an OpenCL development environment for a desktop should be considered differently.

Specifically, a binary code of the kernel source code may be built using an online compiler or an offline compiler.

The offline compiler is a dedicated offline compiler for an OpenCL language. Specifically, offline compilation using the offline compiler is a method of generating a binary code corresponding to a kernel source code by compiling the kernel source code before executing a host program, in other words, before executing a binary code corresponding to a source code of the host program.

Online compilation using the online compiler is a method of generating a binary code of a kernel source code written in an OpenCL language at the time of calling the binary code of the host program.

In this instance, in case of an environment of supporting desktop OpenCL application software development, offline compilers for compiling a binary code of a host program a kernel source code of a kernel program are all provided in a desktop, and therefore the environment is not significantly affected by a type of the compiler.

However, in case of an environment for supporting OpenCL application software development for an embedded system, a host system that develops OpenCL application software using a device for supporting OpenCL application software development and a target system that actually performs the OpenCL application software are separated from each other. Accordingly, a binary code of a kernel program to be transmitted to the target system may differ depending on a type of a compiler and the target system to which the binary code is to be applied.

Specifically, in case of the online compilation, the binary code of the host program and the source code of the kernel program should be transmitted to the target system.

On the other hand, in case of the offline compilation, the binary codes of the host program and the kernel program should be transmitted to the target system.

However, an existing device for supporting OpenCL application software development does not consider these points, and therefore cannot support a convenient and rapid OpenCL application software development environment. As a result, it is difficult for developers to perform OpenCL application development for an embedded system in a general OpenCL development environment.

SUMMARY

Accordingly, example embodiments of the present invention are provided to substantially obviate one or more problems due to limitations and disadvantages of the related art.

Example embodiments of the present invention provide an open computing language (OpenCL) application software development tool device for an embedded system, which is specialized in OpenCL application software development by considering an OpenCL platform of a target system.

Example embodiments of the present invention also provide a method of supporting OpenCL application software development which is reliable by considering a compile type of a kernel source that is required to be considered in OpenCL application software development in an embedded system.

In some example embodiments, a tool for supporting OpenCL application software development in conjunction with a target system, the tool includes: a project management unit configured to separate and store OpenCL application software constituted of a host program and a kernel program into a host source code corresponding to the host program and a kernel source code corresponding to the kernel program, and manage a tool-chain corresponding to an OpenCL platform of the target system; and a builder configured to determine a compile type of the kernel source code and determine whether the kernel source code is built in response to the compile type.

Here, the project management unit may classify and manage the tool-chain as a type of a software development kit (SDK) which is a software development tool.

Also, the project management unit may request information of the OpenCL platform from the target system so as to manage the tool-chain.

Also, the project management unit may manage the OpenCL application software in units of projects.

Also, the builder may set the compile type as any one of online compilation and offline compilation, build a host binary code corresponding to the host source code by compiling only the host source code when the compile type is the online compilation, and build the host binary code corresponding to the host source code and a kernel binary code corresponding to the kernel source code by compiling the host source code and the kernel source code when the compile type is the offline compilation.

Also, the tool for supporting OpenCL application software development may further include a launcher configured to set remote-communication connection to the target system so that the OpenCL application software is executed in the target system and set an application configuration corresponding to the OpenCL application software.

Also, the application configuration may be constituted of the host binary code and the kernel binary code when the compile type is the offline compilation, and constituted of the host binary code and the kernel source code when the compile type is the online compilation.

Also, the tool for supporting OpenCL application software development may further include a remote-processing service calling unit configured to request, when a remote-processing service of the target system is required, the remote-processing service from the target system and receive a remote-processing result.

In other example embodiments, a target system that provides an OpenCL application software development environment in conjunction with a tool for supporting OpenCL application software development, the target system includes: an OpenCL platform detection unit configured to detect an OpenCL platform and provide information about the OpenCL platform to the tool for supporting the OpenCL application software development; and a kernel compile processing unit configured to manage a kernel source corresponding to a kernel program of OpenCL application software.

Here, the target system may further include an application execution unit configured to execute a host binary code corresponding to a host program of the OpenCL application software.

Also, when the tool for supporting the OpenCL application software development to requests a remote-processing service, a process corresponding to the remote-processing service may be executed.

In still other example embodiments, a method of supporting OpenCL application software development of a tool for supporting OpenCL application software development in conjunction with a target system, the method includes: receiving an instruction; and executing an instruction process corresponding to the instruction, wherein, when the instruction is a creation instruction or a modification instruction, the executing of the instruction process includes separating and storing OpenCL application software constituted of a host program and a kernel program into a host source code corresponding to the host program and a kernel source code corresponding to the kernel program and setting a tool-chain corresponding to an OpenCL platform of the target system, and when the instruction is a builder execution instruction, the executing of the instruction process includes determining a compile type of the kernel source code and building the kernel source code in response to the compile type.

Here, the setting of the tool-chain may include classifying the tool-chain as a type of an SDK which is a software development tool.

Also, the setting of the tool-chain may include requesting information of the OpenCL platform from the target system.

Also, the storing of the OpenCL application software may include classifying and storing the OpenCL application software in units of projects.

Also, the determining of the compile type of the kernel source code may include determining the compile type as any one of online compilation and offline compilation, and the building of the kernel source code may include building a host binary code corresponding to the host source code by compiling only the host source code when the compile type is the online compilation and building the host binary code corresponding to the host source code and a kernel binary code corresponding to the kernel source code by compiling the host source code and the kernel source code when the compile type is the offline compilation.

Also, the executing of the instruction process may further include setting, when the instruction is a launcher execution instruction, remote-communication connection to the target system so that the OpenCL application software is executed in the target system and an application configuration corresponding to the OpenCL application software.

Also, the application configuration may be constituted of the host binary code and the kernel binary code when the compile type is the offline compilation, and constituted of the host binary code and the kernel source code when the compile type is the online compilation.

Also, the executing of the instruction process may further include, when a remote-processing service of the target system is required, requesting the remote-processing service from the target system, and receiving a remote-processing result.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
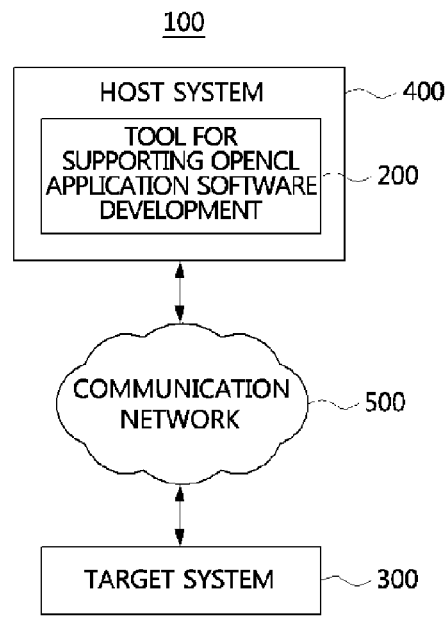
FIG. 1 is a conceptual diagram schematically showing a configuration of a environment for supporting open computing language (OpenCL) application software development for an embedded system according to an embodiment of the present invention.

Example embodiments of the present invention are disclosed herein. However, specific structural and functional details disclosed herein are merely representative for purposes of describing example embodiments of the present invention, and thus example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in reverse order, depending upon the functionality/acts involved.

Hereinafter, preferred embodiments of the present invention will be described in detail with reference to the accompanying drawings.

FIG. 1 is a conceptual diagram schematically showing an environment 100 for supporting open computing language (OpenCL) application software development using a tool 200 for supporting OpenCL application software development for an embedded system according to an embodiment of the present invention.

As shown in FIG. 1, an environment 100 for supporting OpenCL application software development may include a host system 400 and a target system 300 in conjunction with the host system 400 through a communication network 500.

Here, the host system 400 has the tool 200 for supporting OpenCL application software development according to an embodiment of the present invention.

The host system 400 may be constituted as a separate device from the target system 300, and support development of OpenCL application software remotely from the target system 300 that is an embedded system by providing the tool 200 for supporting OpenCL application software development to developers.

Meanwhile, the tool 200 for supporting OpenCL application software development for the embedded system according to an embodiment of the present invention will be described later in detail with reference to FIG. 2.

The target system 300 serves as an embedded system, and provides information requested from the tool 200 in conjunction with the tool 200.

In addition, the target system 300 receives OpenCL application software transmitted from the tool 200, and actually drives the received OpenCL application software.

The target system 300 will be described later in detail with reference to FIG. 3.

That is, the environment 100 for supporting OpenCL application software development according to an embodiment of the present invention may connect the host system 400 and the target system 300 through the communication network 500, and allow the host system 400 to develop the OpenCL application software executed in the target system 300 using the tool 200.

Hereinafter, the tool 200 for supporting OpenCL application software development according to an embodiment of the present invention will be described in detail with reference to FIG. 2.

Figure 2:
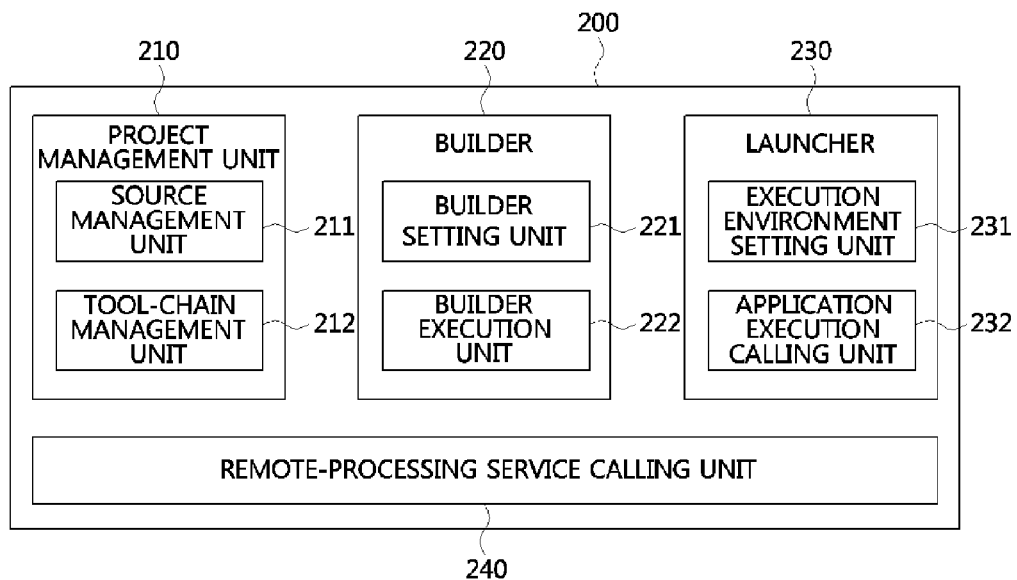
FIG. 2 is a conceptual diagram schematically showing a configuration of a tool for supporting OpenCL application software development according to an embodiment of the present invention.

FIG. 2 is a conceptual diagram schematically showing a configuration of the tool 200 for supporting OpenCL application software development according to an embodiment of the present invention.

First, the tool 200 may receive an instruction from a user, and execute OpenCL application software in response to the received instruction.

In this instance, the instruction of the user may be, for example, a creation or modification instruction of the OpenCL application software, a builder execution instruction, or a launcher execution instruction.

For this, the tool 200 according to an embodiment of the present invention may include a project management unit 210, a builder 220, a launcher 230, and a remote-processing service calling unit 240, as shown in FIG. 2.

When the instruction of the user is the creation or modification instruction of the OpenCL application software, the project management unit 210 stores a source code of the OpenCL application software, and sets a tool-chain corresponding to the created or modified OpenCL application software.

In other words, the project management unit 210 manages the source code of the OpenCL application software and the tool-chain required for creation of a binary code of the OpenCL application software. In this instance, the project management unit 210 may manage the source code of the OpenCL application software in units of, for example, projects.

For this, the project management unit 210 may include a source management unit 211 and a tool-chain management unit 212.

The source management unit 211 manages the source code of the OpenCL application software, that is, source codes.

Specifically, the source management unit 211 may classify, for example, the source codes as host source codes and kernel source codes and manage the classified source codes.

Here, the host source code refers to a source code of a host program, and the kernel source code refers to a source code of a kernel program.

Specifically, the OpenCL application software may be constituted of the host program and the kernel program as described above. The host program is a program that drives the OpenCL application software itself and performs control and data transmission between the host program and the kernel program using an OpenCL application programming interface (API).

The kernel program is a program that is created as a binary code through online compilation or offline compilation to perform an actual computing process.

The tool-chain management unit 212 manages the tool-chain required for creation of the binary code with respect to the source code. In this instance, the tool-chain management unit 212 may manage the tool-chain in accordance with, for example, types of software development kits (SDKs).

Here, the tool-chain management unit 212 may set a tool-chain corresponding to an OpenCL platform of a target system (see, 300 of FIG. 1) in which newly created or modified OpenCL application software is to be executed.

The binary code may be built by compiling the source code, and in this instance, an environment of the host system 400 in which the binary code is developed and an environment of the target system 300 in which the binary code is executed may be different from each other. Here, the tool-chain may indicate a cross compile environment of the tool 200 required for progressing OpenCL application software development.

That is, the tool-chain may provide an environment that allows the binary code capable of being executed in the target system 300 to be created in the tool 200 of the host system 400.

More specifically, the tool-chain may provide a variety of utilities and libraries which are required for creation of the binary code by compiling the source code.

For example, the tool-chain may include an assembler, a linker, a compiler, a library, and the like. As examples of the tool-chain, an Android tool-chain, a Linux tool-chain, and a GNU tool-chain, and the like may be given.

In addition, the tool-chain management unit 212 may request information about the OpenCL platform from a target system (see, 300 of FIG. 1) in order to manage the tool-chain, and manage the tool-chain based on the OpenCL platform. In addition, the tool-chain management unit 212 provides a tool-chain corresponding to the OpenCL platform.

That is, the tool 200 according to an embodiment of the present invention may reflect characteristics of the OpenCL platform of the target system (see, 300 of FIG. 1).

Accordingly, the tool 200 may develop the OpenCL application software in a variety of OpenCL platforms without limitation on a type of the OpenCL platform.

When the instruction of the user is the builder execution instruction, the builder 220 may perform a process of creating the binary code.

For this, the builder 220 may include a builder setting unit 221 and a builder execution unit 222.

The builder setting unit 221 sets a compile option of a kernel source required for the process of creating the binary code. In other words, the builder setting unit 221 sets a compile type.

Specifically, for example, the builder setting unit 221 may set the compile type of to the kernel source as online or offline.

The builder execution unit 222 creates the binary code by compiling the source code based on the compile type set by the builder setting unit 221.

Specifically, the builder execution unit 222 creates a host binary code by compiling a host source code of a host program of OpenCL application software.

In this instance, as described above, the host source code may be written in C or C++, and compiled using a general C or C++ compiler.

Meanwhile, in case of the kernel program of the OpenCL application software, a compile method may differ depending on online compilation or offline compilation.

Specifically, in a case in which the compile type is the online compilation, the kernel source code may be compiled when the host binary code is actually executed in the target system (see, 300 of FIG. 1). Accordingly, the builder execution unit 222 does not execute separate compilation with respect to the kernel source code.

On the other hand, when the compile type is the offline compilation, the kernel source code may be compiled in advance before the host binary code is executed. Accordingly, the builder execution unit 222 may compile the kernel source code to create a kernel binary code. For this, as described above, the builder execution unit 222 may use a cross compiler.

That is, the tool (see, 200 of FIG. 1) for supporting OpenCL application software development according to an embodiment of the present invention creates the binary code corresponding to the OpenCL application software considering the compile type of the kernel source.

In other words, when the compile type is the online compilation, the builder execution unit 222 executes compilation only with respect to the host program to thereby create the host binary code. Accordingly, the kernel binary code for the kernel program is not created.

On the other hand, when the compile type is the offline compilation, the builder execution unit 222 executes compilation with respect to the host program and the kernel program to thereby create the host binary code and the kernel binary code.

When the instruction of the user is the launcher execution instruction, the launcher 230 transmits an application configuration of the OpenCL application software to the target system (see, 300 of FIG. 1) using the communication network (see, 500 of FIG. 1). Accordingly, the OpenCL application software may be executed in the target system (see, 300 of FIG. 1). For this, the launcher 230 may include an execution environment setting unit 231 and an application execution calling unit 232.

The execution environment setting unit 231 sets an execution environment so that the binary code can be executed in an embedded system, that is, the target system (see, 300 of FIG. 1). In this instance, the execution environment may be, for example, remote-communication connection and the application configuration of the OpenCL application software.

Specifically, the execution environment setting unit 231 sets the remote-communication connection to the target system 300 so as to execute the OpenCL application software in the target system 300.

In addition, the execution environment setting unit 231 sets the application configuration of the OpenCL application software to be transmitted to the target system (see, 300 of FIG. 1).

Specifically for example, when the compile type is the offline compilation, the application configuration of the OpenCL application software may be the host binary code and the kernel binary code.

On the other hand, when the compile type is the online compilation, the application configuration of the OpenCL application software may be the host binary code and the kernel source code.

The application execution calling unit 232 calls the OpenCL application software based on the execution environment, and transmits the called OpenCL application software to the target system (see, 300 of FIG. 1).

Specifically, when the compile type is the offline compilation, the application execution calling unit 232 calls the host binary code and the kernel binary code of the OpenCL application software, and transmits the called codes to the target system (see, 300 of FIG. 1).

On the other hand, when the compile type is the online compilation, the application execution calling unit 232 calls the host binary code and the kernel source code of the OpenCL application software, and transmits the called codes to the target system (see, 300 of FIG. 1).

When the project management unit 210, the builder 220, and the launcher 230 require remote-processing services, the remote-processing service calling unit 240 requests the remote-processing services from the target system (see, 300 of FIG. 1).

In addition, the remote-processing service calling unit 240 receives remote-processing results from the target system (see, 300 of FIG. 1). In this instance, the remote-processing service calling unit 240 may provide the received remote-processing results to each component that has requested the remote-processing services.

That is, the tool 200 according to an embodiment of the present invention provides the remote-processing services between the host system (see, 200 of FIG. 1) and the target system. Accordingly, developers may develop the OpenCL application software even in a remote place as well as in a local desktop.

Hereinafter, the target system 300 according to an embodiment of the present invention will be described in detail with reference to FIG. 3.

Figure 3:
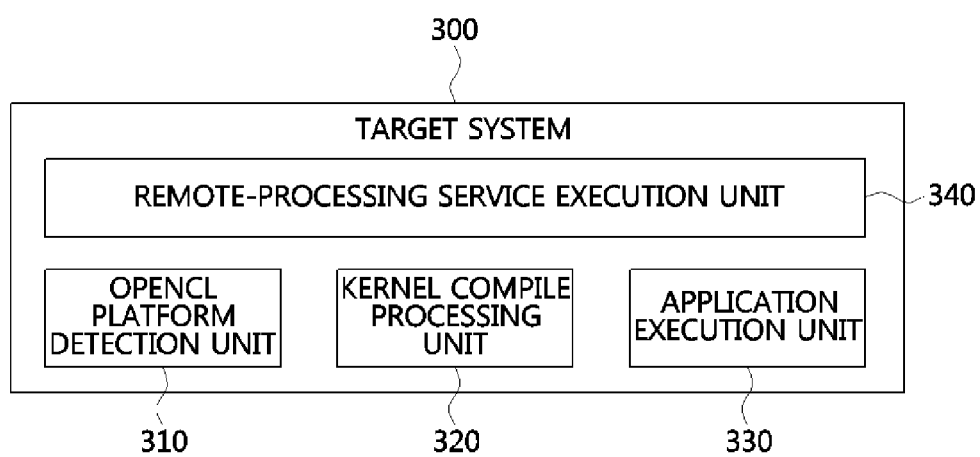
FIG. 3 is a conceptual diagram schematically showing a configuration of a target to system according to an embodiment of the present invention.

FIG. 3 is a conceptual diagram schematically showing a configuration of a target system according to an embodiment of the present invention.

First, the target system 300 is in conjunction with a host system (see, 400 of FIG. 1) through a communication network (see, 500 of FIG. 1).

In addition, the target system 300 provides information requested from a tool (see, 200 of FIG. 1) for supporting OpenCL application software development of the host system (see, 400 of FIG. 1), and drives the OpenCL application software by actually executing an application configuration of the OpenCL application software that is transmitted from the tool (see, 200 of FIG. 1).

For this, the target system 300 may include an OpenCL platform detection unit 310, a kernel compile processing unit 320, and an application execution unit 330.

The OpenCL platform detection unit 310 detects an OpenCL platform of the target system 300, and provides information about the OpenCL platform. In this instance, the information about the OpenCL platform may be used when a tool-chain is set by the tool-chain management unit (see, 212 of FIG. 2).

The kernel compile processing unit 320 manages, when the compile type is online, a kernel source code provided from the tool (see, 200 of FIG. 1), and processes so that the kernel source code can be executed when executing a host binary code.

The application execution unit 330 actually executes the application configuration of the OpenCL application software. Accordingly, the OpenCL application software may be driven in the target system 300.

In this instance, when a developer accesses the target system 300 and inputs a name of a host binary code, driving of the OpenCL application software starts.

Here, the kernel binary code (in case of offline compilation) or the kernel source code (in case of online compilation) should be positioned on the same file system path as the host binary code. This is to normally drive the OpenCL application software in such a manner that codes for a kernel program are called when the host binary code is executed.

When remote-processing services are requested from the tool (see, 200 of FIG. 1), a remote-processing service execution unit 340 controls the target system 300 so that the target system 300 can perform a process corresponding to the remote-processing services. That is, the remote-processing service execution unit 340 may perform the process corresponding to the remote-processing services when the remote-processing services are requested from the host system.

Hereinafter, a method of supporting OpenCL application software development according to an embodiment of the present invention will be described in detail with reference to FIG. 4.

Figure 4:
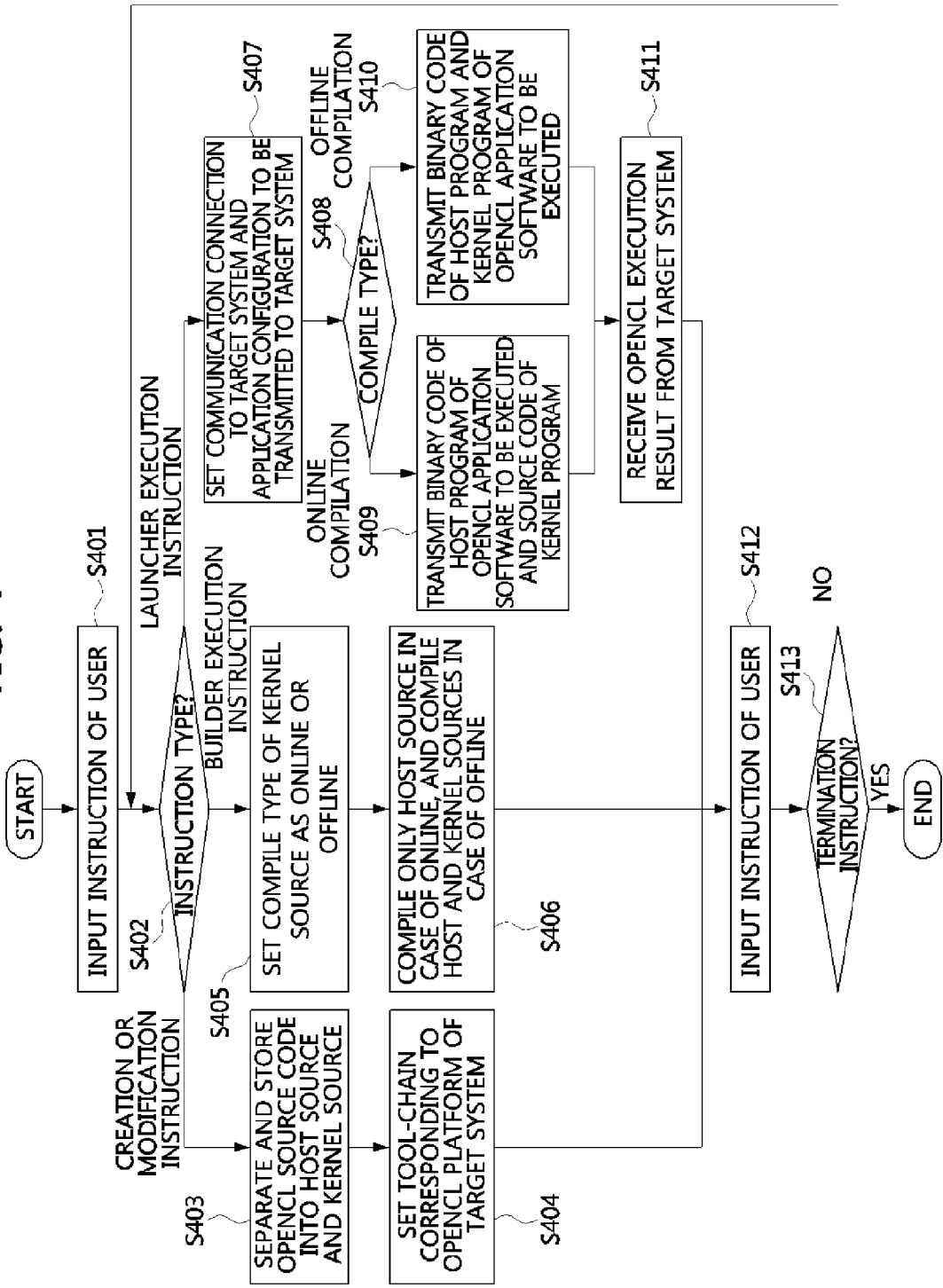
FIG. 4 is a flowchart showing a method of supporting OpenCL application software development which is performed in a device for developing OpenCL application software according to an embodiment of the present invention.

FIG. 4 is a flowchart showing a method of supporting OpenCL application software development which is performed in a device for developing OpenCL application software according to an embodiment of the present invention.

First, in operation S401, an instruction is received from a user.

In operation S402, a corresponding instruction processing operation is performed in accordance with the instruction of the user. In this instance, the instruction of the user may be a new creation or modification instruction of OpenCL application software, a builder execution instruction, or a launcher execution instruction.

Meanwhile, the instruction of the user that executes the OpenCL application software may be executed in units of projects as described above.

Here, in operation S403, when the instruction of the user is the new creation or modification of the OpenCL application software, the OpenCL application software is separated into a host source code and a kernel source code, and the separated source codes are stored and managed.

In addition, in operation S404, a tool-chain corresponding to the OpenCL platform of the target system is set in the source code of the OpenCL application software.

When the instruction of the user is the builder execution instruction, a compile type of the kernel source is set. In this case, in operation S405, the compile type of the kernel source may be online compilation or offline compilation.

In this instance, in operation S406, when the compile type of the kernel source is the online compilation, only a host source code is compiled in the host system, and when the compile type of the kernel source is the offline compilation, both the host source code and the kernel source code are compiled.

In operation S407, when the instruction of the user is the launcher execution instruction, communication connection to the target system and an application configuration of the OpenCL application software to be transmitted to the target system are set.

In case of the offline compilation, the application configuration may be a host binary code and a kernel binary code of the OpenCL application software, and in case of the online compilation, the application configuration may be a host binary code and a kernel source code of the OpenCL application software.

Next, in operation S408, the compile type is determined.

In operation S409, when the compile type is the online compilation, the host binary code and the kernel source code of the OpenCL application software to be executed are transmitted.

In operation S410, when the compile type is the offline compilation, the host binary code and the kernel binary code of the OpenCL application software to be executed are transmitted.

Next, in operation S411, the target system receives execution results of the OpenCL application software.

Each operation is terminated, and then an instruction of the user is received again in operation S412.

In operation S413, whether the instruction of the user is a termination instruction is determined.

In this instance, when the instruction of the user is the termination instruction, the execution of the OpenCL application software stops, and when the instruction of the user is not the termination instruction, operation S402 of determining the type of the instruction is performed again.

As described above, according to the embodiments of the present invention, the OpenCL platform of the target system is considered, and therefore the OpenCL application software may be developed in various OpenCL platforms.

In addition, the compile type of the kernel source which is required to be considered in development of the OpenCL application software in an embedded system is considered, and therefore reliable OpenCL application software may be developed.

In addition, remote-processing services are provided between the host system and the target system, and therefore the OpenCL application software may be rapidly and conveniently developed.

In case of FIGS. 2 and 3 described above, each component of the host system and each component of the target system have been separately divided and described for convenience of description, but each of the host system and the target system may be configured as a single block to perform the above-described operations. In this instance, each of the host system and the target system may include a control unit or a processor in order to process the above-described operations.

The tool for supporting OpenCL application software development according to an embodiment of the present invention may consider the OpenCL platform of the target system, and therefore a development tool specialized in development of the OpenCL application software may be provided, thereby rapidly and conveniently developing the OpenCL application software.

In addition, the method of supporting OpenCL application software development according to an embodiment of the present invention may consider the compile type of the kernel source which is required to be considered in development of the OpenCL application software in the embedded system, and therefore reliable OpenCL application software may be developed.

While the example embodiments of the present invention and their advantages have been described in detail, it should be understood that various changes, substitutions, and alterations may be made herein without departing from the scope of the invention.

What is claimed is:

1. A host system processor configured to support open computing language application software development in conjunction with a target system, comprising:
   a project management unit configured to separate and store open computing language application software constituted of a host program and a kernel program into a host source code corresponding to the host program and a kernel source code corresponding to the kernel program;
   the project management unit configured to set a tool-chain corresponding to an open computing language platform of the target system; and
   a builder configured to set a compilation type to be one of an online compilation type and an offline compilation type and determine whether the kernel source code is compiled in response to the compilation type set by the builder,
   wherein the builder builds a host binary code corresponding to the host source code by compiling only the host source code when the compilation type is the online compilation type, and builds the host binary code corresponding to the host source code and a kernel binary code corresponding to the kernel source code by compiling the host source code and the kernel source code when the compilation type is the offline compilation type.

2. The host system processor configured to support open computing language application software development of claim 1, wherein the project management unit classifies and manages the tool-chain as a type of a software development kit which is a software development tool.

3. The host system processor configured to support open computing language application software development of claim 1, wherein the project management unit requests information of the open computing language platform from the target system so as to manage the tool-chain.

4. The host system processor configured to support open computing language application software development of claim 1, wherein the project management unit manages the open computing language application software in units of projects.

5. The host system processor configured to support open computing language application software development of claim 1, further comprising:
   a launcher configured to set remote-communication connection to the target system so that the open computing language application software is executed in the target system and set an application configuration corresponding to the open computing language application software.

6. The host system processor configured to support open computing language application software development of claim 5, wherein the application configuration is constituted of the host binary code and the kernel binary code when the compilation type is the offline compilation type, and constituted of the host binary code and the kernel source code when the compilation type is the online compilation type.

7. The host system processor configured to support open computing language application software development of claim 1, further comprising:
a remote-processing service calling unit configured to request, when a remote-processing service of the target system is required, the remote-processing service from the target system and receive a remote-processing result.

8. A target system processor configured to provide an open computing language application software development environment in conjunction with a tool processor for supporting open computing language application software development, the target system processor comprising:
an open computing language platform detection unit configured to detect an open computing language platform and provide information about the open computing language platform to the tool processor for supporting the open computing language application software development;
a kernel compile processing unit configured to manage a kernel source code corresponding to a kernel program of open computing language application software so that the kernel source code is capable of being executed when executing a host binary code; and
an application execution unit configured to execute the host binary code corresponding to a host source code and a kernel binary code corresponding to a kernel source code when a compilation type is set to an offline compilation type, and to execute the kernel source code and the host binary code corresponding to the host source code when a compilation type is set to an online compilation type.

9. The target system processor of claim 8, wherein, when the tool processor for supporting the open computing language application software development requests a remote-processing service, a process corresponding to the remote-processing service is executed.

10. A method of supporting open computing language application software development of a tool for supporting open computing language application software development in conjunction with a target system, the method comprising:
receiving an instruction; and
executing an instruction process corresponding to the instruction,
wherein, when the instruction is a creation instruction or a modification instruction, the executing of the instruction process includes separating and storing open computing language application software constituted of a host program and a kernel program into a host source code corresponding to the host program and a kernel source code corresponding to the kernel program and setting a tool-chain corresponding to an open computing language platform of the target system, and
when the instruction is a builder execution instruction, the executing of the instruction process includes setting a compilation type of the kernel source code to be one of an online compilation type and an offline compilation type and determining whether to compile the kernel source code in response to the compilation type,
wherein the compiling of the kernel source code includes building a host binary code corresponding to the host source code by compiling only the host source code when the compilation type is the online compilation type, and building the host binary code corresponding to the host source code and a kernel binary code corresponding to the kernel source code by compiling the host source code and the kernel source code when the compilation type is the offline compilation type.

11. The method of claim 10, wherein the setting of the tool-chain includes classifying the tool-chain as a type of a software development kit which is a software development tool.

12. The method of claim 10, wherein the setting of the tool-chain includes requesting information of the open computing language platform from the target system.

13. The method of claim 10, wherein the storing of the open computing language application software includes classifying and storing the open computing language application software in units of projects.

14. The method of claim 10, wherein the executing of the instruction process further includes setting, when the instruction is a launcher execution instruction, remote-communication connection to the target system so that the open computing language application software is executed in the target system and an application configuration corresponding to the open computing language application software.

15. The method of claim 14, wherein the application configuration is constituted of the host binary code and the kernel binary code when the compilation type is the offline compilation type, and constituted of the host binary code and the kernel source code when the compilation type is the online compilation type.

16. The method of claim 10, wherein the executing of the instruction process further includes, when a remote-processing service of the target system is required, requesting the remote-processing service from the target system, and receiving a remote-processing result.

* * * * *